US011978003B2

(12) United States Patent
Minter et al.

(10) Patent No.: US 11,978,003 B2
(45) Date of Patent: May 7, 2024

(54) USE MULTIPLE ARTIFICIAL INTELLIGENCE (AI) ENGINES TO DETERMINE A NEXT BEST ACTION FOR PROFESSIONAL DEVELOPMENT OF EMPLOYEES

(71) Applicant: AmplifAI, Plano, TX (US)

(72) Inventors: Vishal Sean Minter, Highland Village, TX (US); Ali Akberali Gowani, Carrollton, TX (US); Parthasarathy Sundar Karthikeyan, Plano, TX (US)

(73) Assignee: AmplifAI Solutions Inc., Plano, TX (US)

( * ) Notice: Subject to any disclaimer, the term of this patent is extended or adjusted under 35 U.S.C. 154(b) by 356 days.

(21) Appl. No.: 17/539,576

(22) Filed: Dec. 1, 2021

(65) Prior Publication Data
US 2022/0245541 A1    Aug. 4, 2022

Related U.S. Application Data

(63) Continuation-in-part of application No. 17/162,469, filed on Jan. 29, 2021, now Pat. No. 11,790,303.

(51) Int. Cl.
*G06Q 10/00*        (2023.01)
*G06Q 10/0639*     (2023.01)

(52) U.S. Cl.
CPC .............. *G06Q 10/0639* (2013.01)

(58) Field of Classification Search
CPC .......................... G06Q 10/00–50/00

USPC ........................................ 705/7.14
See application file for complete search history.

(56) References Cited

U.S. PATENT DOCUMENTS

| | | | |
|---|---|---|---|
| 2005/0192831 A1* | 9/2005 | Ellison ............ | G06Q 10/06398 705/345 |
| 2010/0114672 A1* | 5/2010 | Klaus ....................... | G09B 7/00 705/7.14 |
| 2019/0012167 A1* | 1/2019 | Boss ...................... | G06Q 50/01 |
| 2021/0334729 A1* | 10/2021 | Watt, Jr. ........... | G06Q 10/06398 |

* cited by examiner

*Primary Examiner* — Mustafa Iqbal
(74) *Attorney, Agent, or Firm* — Shiv S. Naimpally; Flagship Patents

(57) ABSTRACT

In some examples, a server determines, based on a portion of aggregated data, a plurality of metrics associated with an employee. The aggregated data includes activities performed by the employee using a computing device. The server determines, based on the plurality of metrics, a unified metric associated with the employee. The server determines a distribution curve based on the unified metric associated with the employee and based on additional unified metrics associated with additional employees. The server determines a location of the employee on the distribution curve. The server predicts, using a plurality of artificial intelligence engines executing on the server and based on the location of the employee on the distribution curve, a next best action for the employee and sends the next best action to the employee and to a supervisor of the employee to improve a future performance of the employee.

20 Claims, 6 Drawing Sheets

| METRIC 302 | TYPE 304 | COACHABLE 306 | GOAL 308 | ACTUAL 310 | % TO GOAL 312 | SCORECARD WEIGHT 314 | SCALED SCORECARD 316 | GOAL WEIGHT 318 | GOAL SCALED 320 |
|---|---|---|---|---|---|---|---|---|---|
| METRIC #1 | REGULAR | YES | 92 | 98 | 107 | 2.5 | 0.027 | 1.0 | 98 |
| METRIC #2 | REGULAR | YES | 720 | 698 | 97 | 5.0 | 0.048 | 1.0 | 698 |
| ⋮ | | | | | | | | | |
| METRIC #P | INVERSE | YES | 6.9 | 2.5 | 36 | 10.0 | 0.036 | 2.0 | 13.8 |

| | PERSONA WEIGHT 322 | PERSONA TARGET 324 | % TO PERSONA TARGET 326 | SCALED PERSONA 328 | PREVIOUS PREDICTION 330 | CURRENT PREDICTION 332 | NEXT BEST ACTION VALUE 334 |
|---|---|---|---|---|---|---|---|
| METRIC #1 | 1.0 | 102 | 0.967 | 0.967 | 86 | 88 | 0.994 |
| METRIC #2 | 1.0 | 558 | 0.752 | 0.752 | 62 | 65 | 0.801 |
| ⋮ | | | | | | | |
| METRIC #P | 1.0 | 0.0 | 0.0 | 0.0 | 51 | 51 | 0.036 |

FIG. 3

USE MULTIPLE ARTIFICIAL INTELLIGENCE (AI) ENGINES TO DETERMINE A NEXT BEST ACTION FOR PROFESSIONAL DEVELOPMENT OF EMPLOYEES

CROSS-REFERENCE TO RELATED APPLICATIONS

The present patent application is a continuation-in-part of U.S. patent application Ser. No. 17/162,469, filed on Jan. 29, 2021, entitled "ANALYZING AGENT DATA AND AUTOMATICALLY DELIVERING ACTIONS" which is incorporated by reference herein in its entirety and for all purposes as if completely and fully set forth herein.

BACKGROUND OF THE INVENTION

Field of the Invention

This invention relates generally to a system to analyze employee actions and determine, using artificial intelligence (AI), a next best action associated with professional development of employees.

Description of the Related Art

When many employees in a corporation ("enterprise") are performing similar tasks, such as customer service-related tasks (e.g., helpdesk), the corporation may desire to identify and improve employees that have less than a threshold level of performance. However, identifying employees with less than a threshold level of performance, determining which specific areas each employee needs to improve upon, and determining how to address those specific areas is a complex task. In addition, in a hierarchical organization, many subgroups (e.g., line of business, department, or the like) may use their own performance evaluation criteria, thereby increasing the complexity of determining how to improve each employee's performance.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server includes one or more processors and one or more non-transitory computer readable media storing instructions executable by the one or more processors to perform various operations. The operations include determining, based on a portion of aggregated data, a plurality of metrics associated with an employee. The aggregated data includes activities performed by the employee using a computing device. The operations include determining, based on the plurality of metrics, a unified metric associated with the employee. The operations include determining a distribution curve based on the unified metric associated with the employee and based on additional unified metrics associated with additional employees. The operations include determining a location of the employee on the distribution curve. The operations include predicting, by a plurality of artificial intelligence engines executing on the server and based on the location of the employee on the distribution curve, a next best action for the employee. The operations include sending information associated with the next best action to the employee and to a supervisor of the employee to improve a future performance of the employee.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3 is a diagram illustrating metrics used to determine a next best action, according to some embodiments.

DETAILED DESCRIPTION

Figure 1:
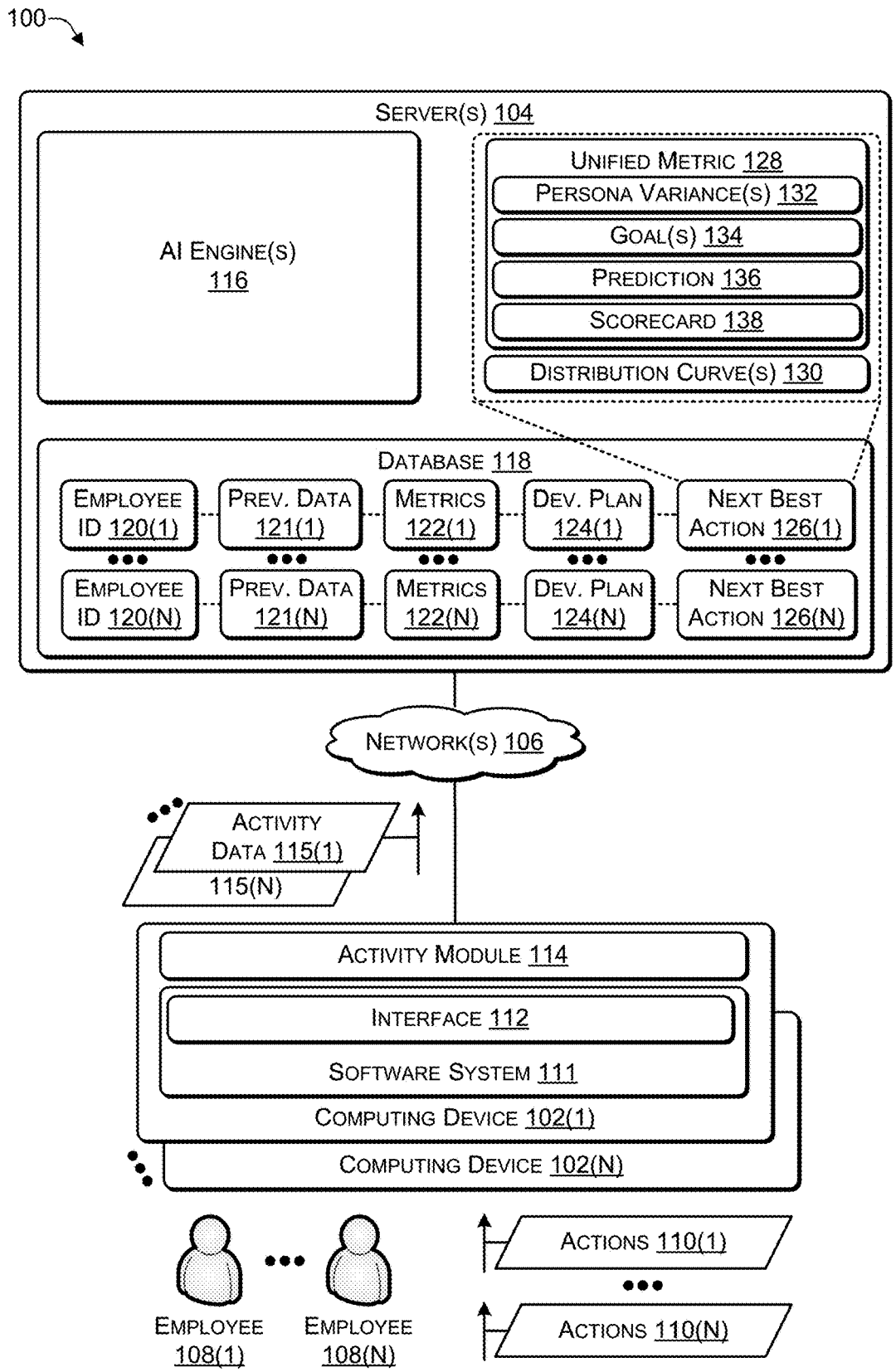
FIG. 1 is a block diagram of a system that includes a server to gather activity data associated with employees, according to some embodiments.

U.S. patent application Ser. No. 17/162,469 describes systems and processes to enable detection of metrics, actions or both and automatically deliver actions, such as coaching and automated learning, to target result effective variables to change future outcomes. A result effective variable may be characterized as a variable with a causal link to other variables or a variable that precipitates changes in other variables, metrics, or outcomes. These systems and processes may be powered by multiple types of machine learning to identify the result effective variables, generate target metrics, and automate actions to be taken based on a variance of actual metrics from the target metrics. The systems and processes may be adaptive to the needs, goals, and selected machine learning methodology and may be adaptive to employee psychology, employee experience, and customer base.

The systems and techniques described herein determine a next best action (NBA) for each employee based on comparing a previously predicted performance with actual performance and based on predicting future performance. For example, the NBA may take into account (i) particular goals and priorities set by a sub-division of an enterprise, (ii) a score associated with individual employees based on their performance in a particular time period (e.g., X days, X>0) relative to the goals and priorities, (iii) how individual employee performance differs relative to exemplary employees (e.g., personas), (iv) the predicted performance of individual employees, (v) where individual employees are located on a distribution curve that includes the scores of multiple employees, other factors, or any combination thereof. The NBA may be designed to improve the predicted future performance. For example, if one or more AI engines predict a particular performance for an employee based on the employee's actions during a particular time period, the AI engines may determine the NBA to improve the employee's performance.

As an example, a server may have one or more processors and a memory to store instructions executable by the one or more processors to perform various operations. For example, the operations may include receiving, from a computing device, activity data associated with activities performed by an employee in a first time interval, storing the activity data with previously gathered data to created aggregated data, and selecting a portion of the aggregated data associated with a second time interval, the second time interval greater than the first time interval. The operations may include determining, based on a portion of aggregated data, a plurality of metrics associated with an employee. The aggregated data may include activities performed by the employee using a computing device. The operations may include determining, based on the plurality of metrics, a unified metric associated with the employee and creating a distribution curve based on the unified metric associated with the employee and based on additional unified metrics associated with additional employees. For example, determining the unified metric may include: (1) determining a persona variance comprising a difference between the location of the employee on the distribution curve and a second location of a second employee on the distribution curve, the second employee having a greater score on the distribution curve than the employee, (2) determining a goal difference between a target goal set for the employee and an actual goal achieved by the employee, the actual goal determined based on the based on the plurality of metrics, (3) determining a scorecard associated with the employee that is determined based on the plurality of metrics, and (4) determining a predicted performance associated with the employee for a subsequent time period, the predicted performance predicted by the plurality of artificial intelligence engines. Determining the unified metric may also include: (1) performing a personal scaling of the persona variance to create a scaled persona variance, (2) performing a goal scaling of the goal difference to create a scaled goal difference, (3) performing a scorecard scaling of the scorecard to create a scaled scorecard, (4) performing a prediction scaling of the predicted performance to create a scaled predicted performance, and (5) determining the unified metric based on a weighted sum of the scaled persona variance, the scaled goal difference, the scaled scorecard, and the scaled predicted performance. The operations may include determining a location of the employee on the distribution curve. The operations may include predicting, by a plurality of artificial intelligence engines executed by the server and based on the location of the employee on the distribution curve, a next best action for the employee. For example, the next best action may include: (1) scheduling a nudge, (2) scheduling a training class, (3) scheduling a coaching session with a supervisor, (4) scheduling the employee to receive a type of positive reinforcement, or any combination thereof. The operations may include dividing the distribution curve into: (1) a below average portion, (2) an average portion, and (3) an above average portion. Determining the next best action may be based at least in part on which portion of the distribution curve the employee is located. The operations may include sending, by the one or more processors, information associated with the next best action to the employee and to a supervisor of the employee to improve a future performance of the employee. The operations may include determining a development plan for the employee based at least in part on the location of the employee on the distribution curve. The operations may include retraining, at a predetermined time interval or based on determining that an accuracy of a prediction fails to satisfy a threshold, individual artificial intelligence engines of the plurality of artificial intelligence engines using training data that includes recently received data to create a plurality of retrained artificial intelligence engines, determining an accuracy of individual artificial intelligence engines of the plurality of retrained artificial intelligence engines, and selecting a subset of the plurality of retrained artificial intelligence engines based at least in part of the accuracy. For example, a first artificial intelligence engine of the plurality of artificial intelligence engines may use a first type of artificial intelligence algorithm and a second artificial intelligence engine of the plurality of artificial intelligence engines may use a second type of artificial intelligence algorithm that is different from the first type of artificial intelligence algorithm.

FIG. 1 is a block diagram of a system 100 that includes a server to gather activity data associated with employees, according to some embodiments. The system 100 includes multiple computing devices 102(1) to 102(N) (N>0) connected to one or more servers 104 via one or more networks 106.

Individual ones of the computing devices 102 may be associated with (e.g., used by) individual employees. For example, an employee 108(1) may be associated with the computing device 102(1) and an employee 108(N) may be associated with the computing device 102(N). Individual ones of the employees 108 may perform one or more actions using their associated computing device 102. For example, the employee 108(1) may perform actions 110(1) using the computing device 102(1) and the employee 108(N) may perform actions 110(N) using the computing device 102(N). The employees 108 may, in some cases, be associated with a particular group (e.g., line of business) and/or subgroup (department) within a corporation (e.g., an enterprise). For example, the employees 108 may be part of a customer facing group, such as sales, support, helpdesk, or the like.

Individual ones of the computing devices 102 may include a software system 111, such as, for example, a customer relationship management (CRM) system, a help desk system, or another type of software system. An activity module 114 may monitor the activities, such as the actions 110, performed by each of the employees 108 on each of the associated computing devices 102. In some cases, the activity module 114 may monitor the activities of the employees 108 by accessing an interface 112, such as an application programming interface (API) or the like, associated with the software system 111.

The activity module 114 that is executing on each of the computing devices 102 may send activity data 115 to the server 104 at a predetermined interval, based on determining that a particular event has occurred, or any combination thereof. For example, the activity module 114 may send the activity data 115 to the server 104 at a predetermined interval, such as, every M hours (M>0), e.g., every hour (e.g., M=1), every M=24 hours (e.g., every day), every M=768 hours (e.g., every week), or the like. The computing device 102(1) may send the activity data 115(1) and the computing device 102(N) may send the activity data 115(N).

The server 104 receives the activity data 115 from individual ones of the computing devices 102 and stores the activity data 115 in a database 118. The server 104 uses one or more artificial intelligence (AI) engines 116 to analyze the activity data 115. In some cases, the AI engines 116 may include up to 20 AI engines. The term AI engine refers to a particular type of machine learning algorithm. The server 104 may use multiple types of machine learning algorithms including, for example, supervised learning algorithms (e.g., classifier, regression, ensemble), unsupervised learning algorithms (e.g., apriori, association, K-means clustering, principal component analysis, dimensionality reduction), reinforcement learning, linear regression, logistic regression, classification and regression trees (CART), naive Bayes, Bayesian network, K-nearest neighbors, random forest, artificial neural network, decision tree, support vector machine (SVM), and the like.

Each of the employees 108 may have a corresponding employee identifier (ID). For example, the employee 108(1) may have an employee ID 120(1) and the employee 108(N) may have an employee ID 120(N). The server 104 may store the activity data 115 with previously gathered data 121 and use the AI engines 116 to determine metrics 122 associated with each employee ID 120. For example, the previously gathered data 121 may be cumulative and may include the activity data 115 received over a longer period of time, such as a large portion of the employee's career working at the enterprise. For example, if the employee 108(N) has worked for X number of years at a particular company, the previously gathered data 121 may include the activity data 115 from at least a portion of those years. The AI engines 116 may analyze the previously gathered data 121 and the metrics 122 to determine a development plan 124, including a next best action 126, for individual ones of the employees 108.

The AI engines 116 may, based on the development plan 124, determine a next best action 126 for each employee ID 120, thereby determining a next action for the professional development of each of the employees 108. The AI engines 116 may determine the next best action 126 based on a unified metric 128 and a distribution curve 130. The unified metric 128 may be determined based on four factors: (i) persona variance 132, (ii) goals 134, (iii) a prediction 136, (iv) and a scorecard 138.

The scorecard 138 indicates how each employee 108 scores based on the employee's metrics 122 (e.g., including the activity data 115) relative to importance and/or weights provided by the enterprise. For example, the metrics 122 may include hundreds or even thousands of measurements associated with the actions 110. In a given time period, the enterprise may be focused on improving a portion (e.g., top 3, top 5, top 10 most important) of the metrics. The metrics that the enterprise selects as the most important may vary from one time period to another, e.g., from month to month, from quarter to quarter, from year to year, or the like. For example, in a first month, the enterprise may prioritize upselling an extended warranty to those calling into a global help desk. In a second month, the enterprise may prioritize the speed at which a caller's problem is resolved after calling the global help desk. In a third month, the enterprise may prioritize customer satisfaction, e.g., as measured by a survey. In a fourth month, the enterprise may prioritize reducing the number of handoffs between agents. A handoff occurs when a first agent transfers a call to a second agent, e.g., "I am going to put you on hold and transfer you to another agent in a different department". In addition, in a hierarchical organization, the scorecard 138 may be specific to a particular portion of the hierarchical organization. For example, the enterprise may have multiple lines of business (LOBs) and each particular LOB may have a particular set of metrics for their scorecard 138. In addition, each department within an LOB may set their own scorecard 138.

The persona variance 132 measures how each employee 108 ranks relative to other employees in a particular peer group. For example, the metrics 122 are used to determine the scorecard 138 for each employee 108. The employees 108 that are in a particular peer group (e.g., the enterprise may define multiple peer groups) are placed on one or more distribution curves 130 based on their respective scorecards 138.

The distribution curves 130 are used to identify top performing employees (also referred to as personas) and determine how far other employees are from the top performing employees. Based on each employee's scorecard 138, the employees 108 may be placed on one or more distribution curves 130. For example, each of the employees 108 may be scored on a particular aspect of their job based on the metrics 122, such as, for example, average time taken to resolve a customer issue, whether they handoff a customer to another employee and how often, customer satisfaction as a result of the solution presented by the employee, and the like. Each employee's score for a particular task may be placed on a distribution curve of the distribution curves 130. Each distribution curve 130 may be subdivided into two or more portions. For example, when a distribution curve is divided into three portions, a leftmost portion of the distribution curve may include below average performers, a middle portion of the distribution curve may include average performers, and a right portion of the distribution curve may include above average performers.

Each of the employees 108 may be evaluated using one or more distribution curves 130. For example, each of the distribution curves 130 may correspond to each of the goals 134. For a particular employee, the distance of the particular employee to a persona in a distribution curve is used to determine the development plan 124 and the next best action 126. For example, the next best action 126 for a particular employee may be designed to move the employee's position on the distribution curve towards the persona. The enterprise may set a threshold as to when to terminate an employee, such as an outlier (e.g., an employee that has below average performance on the distribution curve). For example, if an employee has not improved their position on the distribution curve after a particular period of time (e.g., Y days, Y>0), after the next best action 126 has failed to improve the employee's position on the distribution curve, or both, then the employee may be removed from the current peer group and either terminated or moved to a different peer group. To illustrate, the AI engines 116 may determine, based on the employee's metrics 122, that a particular employee is better suited for a sales group rather than a customer service group. As another example, an employee who is in the top ⅓ and is considered above average may still have room to improve and move towards the top-end of the distribution curve. With multiple distribution curves 130, the next best action 126 may be selected based on identifying which of the distribution curves 130 a particular employee has the greatest persona variance 132. For example, if there are five goals 134 and an employee is evaluated using five corresponding distribution curves 130, then the distribution curve where the employee has the largest persona variance 132 may be used to determine the next best action 126. To illustrate, the employee may be average in four of the five distribution curves 130 and below average in a particular one of the distribution curves 130. The distribution curve where the employee is below average may be used to select the next best action 126(N). As another illustration, the employee may be above average in four of the five distribution curves 130 and average in a particular one of the distribution curves 130. The distribution curve where the employee is average may be used to select the next best action 126(N). As yet another illustration, the employee may be above average in three of the five distribution curves 130 and average in two of the distribution curves 130. The distribution curve where the employee is the furthest from the persona may be used to select the next best action 126(N). Depending on where they are on a particular one of the distribution curves 130, the next best action 126 may be different for different people. For example, rather than wait for a supervisor to become available to coach an employee that is below average, the AI engines 116 may automatically schedule self-learning (e.g., on demand training) to improve the employee's performance as quickly as possible.

One or more managers in the enterprise may set the one or more goals 134. The goals 134 may be common for each peer group but may vary from one peer group to another peer group. Typically, a company-wide goal may be common to all peer groups while other goals may be set for each peer group within the context of the common goal. For example, a company goal may be "customer first" and how this is achieved may vary from one peer group to another. In some cases, one or more of the goals 134 may vary based on a number of years' experience, e.g., newly hired employees may have basic goals (e.g., on average, resolve a problem in Z minutes) while those that have been with the enterprise a longer time may have specific, detailed goals that require experience to achieve (e.g., on average, resolve a problem in half the time of the new hires, e.g., Z/2 minutes).

The prediction 136 may include predictions by the AI engines 116 on each of the employee's 108 predicted performance based on the metrics 122 and a previously determined next best action. In some cases, the AI engines 116 may receive the activity data 115 at the close of business every Friday and predict employee performance for the next week based on a portion of the metrics 122 (e.g., data accumulated from the prior 2 months).

The persona variances 132, the goals 134, the prediction 136, and the scorecard 138 are used to create the unified metric 128. For example, the metrics 122 of an employee in a help desk may include an average handling time, first call resolution, and the like. Each metric of the metrics 122 may be normalized, e.g., scaled to be within a particular range, such as between 0.00 to 1.00, 0 to 100, or the like. For example, the average handling time may be measured in seconds and then normalized to be between 0 and 100, with 0 being the fastest and 100 being the longest time.

The development plan 124, the next best action 126, or both may include actions such as outlier nudge, micro-learning content, coaching sessions, recognition actions, and the like. A nudge is a method of communication that modifies the presentation of choices in a way that makes people more likely to pick the option that benefits them. For example, a conventional communication influences behavior by changing attitudes using persuasive information while a nudge targets behaviors through changes based on how choices are structured and/or communicated to an employee. The systems and techniques described herein use a nudge to cause an employee to select one or more actions that cause the employee to go from below average to average or from average to above average. Micro-learning content may be designed to address specific deficiencies identified by the analysis of the metrics 122. For example, an employee at a help desk may be poor in resolving issues associated with a particular operating system (e.g., Apple® iOS), but may be proficient in resolving issues associated with other operating systems (e.g., Android® and Windows®). In this example, the employee may be provided with micro-learning to improve the employee's handling of issues with the particular operating system. For each employee, the AI engines 116 may determine a largest persona variance 132 across all goals 134 to determine which area the employee needs the most improvement and predict the next best action 126 to move the employee to a next level (e.g., from below average to average, or from average to above average, barely above average to very near the persona.

Thus, even when two different employees have the same scorecard 138, each employee may have a plan that is uniquely tailored to their specific skills, strengths, and weaknesses. In addition, the AI engines 116 may identify, for some of the employees 108 (e.g., those who are above average or those who have made a significant improvement in terms of their position on the distribution curve 130), a positive reinforcement to encourage the employees above average performance or improvement in their position on the distribution curve 130. For example, the AI engines 116 may determine a next best action 126 for a particular employee. After a week, the AI engines 116 may analyze the activity data 115 and the metrics 122 and determine that the particular employee has made a significant improvement in their position on the distribution curve 130 by moving from below average to above average. In such a situation, the AI engines 116 may analyze the metrics 122 and the activity data 115 to determine a suitable positive reinforcement for the employee. For example, if the AI engines 116 determine that the employee responds to a particular type of reinforcement (e.g., a gift card for dinner), then the next best action 126 may include providing the employee with the particular type of reinforcement.

Thus, in an enterprise, an activity module on individual employee computing devices may gather activity data associated with actions performed by individual employees and send the activity data to a server. For example, the activity module may send the activity data every Friday for activities performed during the past week. The server may use artificial intelligence engines to analyze the activity data, as well as previously gathered activity data, to determine a score associated with how well individual employees are meeting or exceeding goals set by the enterprise. The server may identify where individual employees deviate the most from top performing employees (e.g., personas) and determine a next best action on how to improve individual employee's performance. In this way, below average employees may be provided with next best actions to improve their performance to average or above average, average employees may be provided with next best actions to improve their performance to above average, an above average employees may be provided with next best actions to stay above average or move higher along the distribution curve while remaining above average. The next best action may include training, micro-learning, positive reinforcement, on demand training, coaching via a peer, a manager, or a supervisor, or other type of action. The AI engines may learn how each employee can be improved. For example, in a first week the AI engines may determine a first next best action and, if the first next best action does not provide the predicted improvement in the employee's performance, then in a second week the AI engines may determine a second next best action, and so on. If the employee's performance does not improve after a certain number of next best actions, the employee may be flagged for termination or transfer to a different portion of the organization. If the employee's performance improves, the AI engines may identify what specific next best action was able to move the employee higher up the distribution curve. In this way, the AI engines may learn what next best actions are suitable for which type of employees in which portions (e.g., LOB, department, or the like) of the organization and which next best actions are not suitable. The AI engines may be periodically retrained using the data in the database 118 to further improve predictions. For example, the AI engines may be retrained every P months (P>0) to determine which next best actions have the most and least success.

Figure 2:
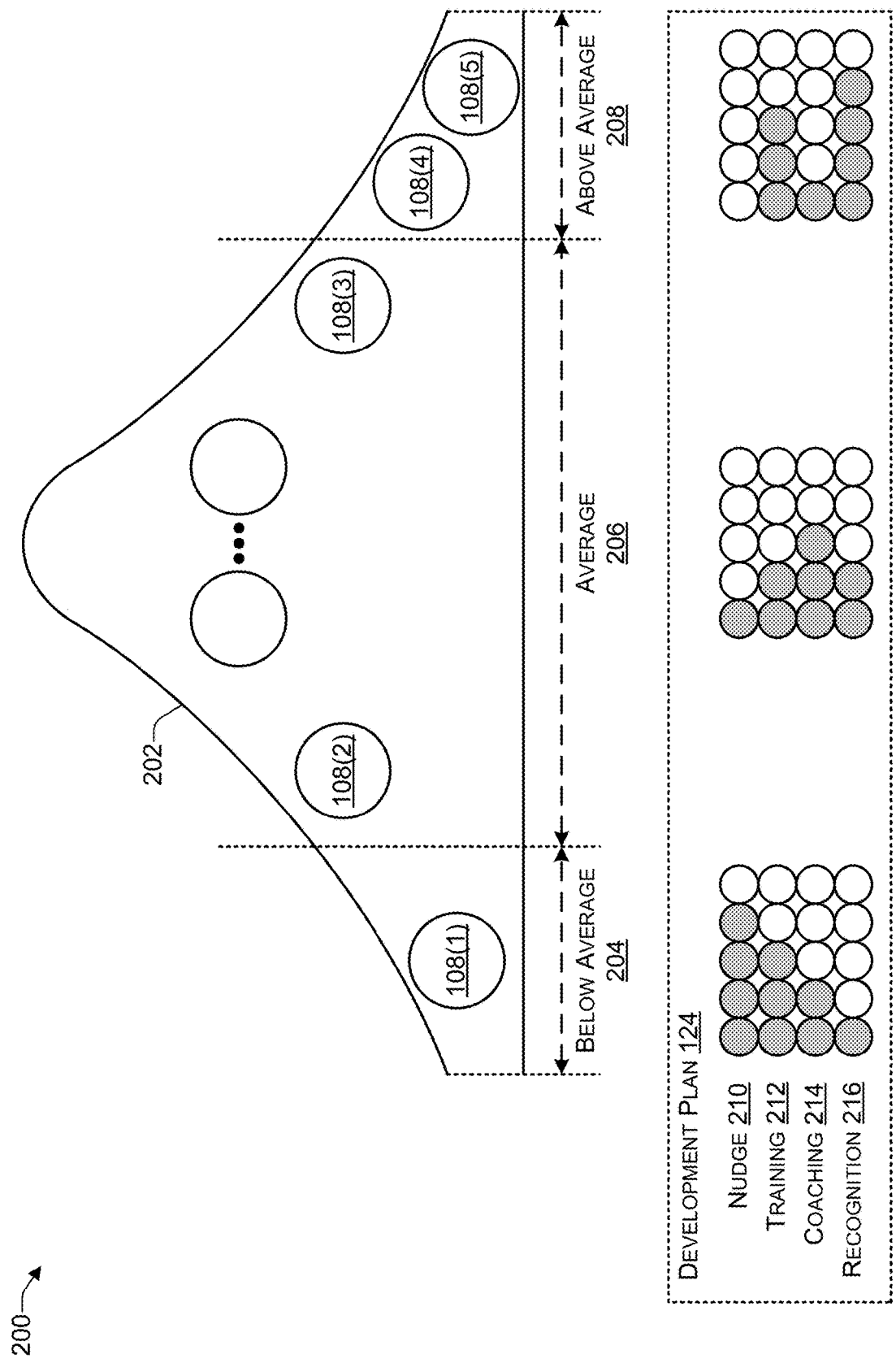
FIG. 2 is a diagram illustrating a distribution curve, according to some embodiments.

FIG. 2 is a diagram 200 illustrating a distribution curve 202, according to some embodiments. The distribution curve 202 may be created based on scorecards 138 of FIG. 1 associated with multiple of the employees 108. The distribution curve 202 may be determined with respect to each of the goals 134. For example, if the enterprise sets six goals then six distribution curves may be created with the distribution curve 202 representing one of those six distribution curves.

The distribution curve 202 may be divided into two or more portions. For example, as illustrated in FIG. 2, the distribution curve 202 may be divided into three portions, low average 204, average 206, and above average 208. Of course, the distribution curve 202 may be divided into more than three portions. The employee 108(1) may belong to the below average 204.

The development plan 124 (including the next best action 126) for those in the below average 204 may include a nudge 210, training 212, coaching 214, and recognition 216. As illustrated in FIG. 2, a number (e.g., A>0) of the employees in the below average portion 204 may be provided with some form of a nudge 210 to move them into the average 206. A smaller number (e.g., B<A) of the employees in the below average portion 204 may be provided with the training 212, such as on-demand training or micro-learning. Since the training 212 does not involve another person and can be delivered via a computing device, the training will 212 may be provided as quickly as possible to the employee. A still smaller number (e.g., C<B<A) of the employees in the below average portion 204 may be provided with the coaching 214 by scheduling a coaching session with a supervisor or manager. In some cases, a very few (e.g., D<C<B<A) of the employees in the below average portion 204 may be provided with recognition 216 (e.g., positive reinforcement). For example, if the employee 108(1) moves from the leftmost edge of the below average group 204 to the rightmost edge of the below average group 204, then in some cases, the employee 108(1) may be provided with recognition 216.

For a number (e.g., E>0) of employees in the average portion 206, the coaching 214 may be provided as part of the development plan 124. For a smaller number (e.g., F<E) of employees in the average portion 206, the training 212 or the recognition 216 may be provided as part of the development plan 124. For example, if the employee 108(2) moves from the leftmost edge of the average group 206 to the rightmost edge of the average group 206 (e.g., close to the employee 108(3)), then in some cases, the employee 108(1) may be provided with recognition 216. In some cases, a few (e.g., G<F<E) of the employees in the average portion 206 may be provided with the nudge 210.

For employees that are in the above average portion 208, many (e.g., H>0) of the employees will receive the recognition 216 (e.g., positive reinforcement). A fewer (e.g., I<H) number of employees in the above average portion 208 may be provided with the training 212 as part of their development plan 124. In some cases, a relatively smaller number (e.g., J<I<H) of employees in the above average portion 208 may be provided with the coaching 214. The goal with the development plan 124 four employees in the above average portion 208 may be to take them from the leftmost edge of the above average portion 208 (e.g., the employee 108(4)) to the rightmost portion of the above average portion 208, e.g., closer to a persona (e.g., employee 108(5)) of the distribution curve 202.

The AI engines 116 of FIG. 1 may identify, based on the metrics 122, what type of development plan 124 causes the most desirable outcome for each employee 108. For example, a first employee may have a largest improvement when provided with the nudge 210, a second employee may have a largest improvement when provided with the training 212, a third employee may have a largest improvement when provided with the coaching 214, and a fourth employee may have the largest improvement when provided with the recognition 216. In addition, the AI engines 116 may determine, based on where an employee is on the distribution curve 202, which of the development plans 124 are predicted to provide the largest improvement. For example, employees in the below average portion 204 may have the largest improvement when provided with the nudge 210. Employees in the average portion 206 may have the largest improvement when provided with the coaching 214. Employees in the above average portion 208 may have the largest improvement when provided with the recognition 216. Thus, the AI engines 116 may determine the development plan 124 for a particular employee based on (1) which type of next best action (e.g., nudge 210, training 212, coaching 214, or recognition 216) creates the largest improvement in the particular employee and (2) where the particular employee is located on the distribution curve 202.

The distribution curve 202 is associated with one particular goal of multiple goals set by the enterprise (typically by a portion of the enterprise in a hierarchical organization, such as a line of business, section, department, or the like). The AI engines 116 may determine the next best action 126 of FIG. 1 by determining where a particular employee is on each of multiple distribution curves associated with the multiple goals and determining which distribution curve of the multiple distribution curves will result in the largest benefit for the particular employee. For example, assume an employee belongs to an organization that has set six goals. Based on the employee activity data 115 and metrics 122, a distribution curve is created for each of the six goals, thereby resulting in six distribution curves (e.g., one for each goal). A particular employee may be ranked above average 208 on two of the distribution curves, average 206 on three of the distribution curves, and below average 204 on a particular distribution curve. Because the particular employee is ranked below average on the particular distribution curve, the distance between the particular employee and the persona (e.g., an employee who is furthest to the right on the distribution curve) is greatest for the particular distribution curve. In this example, the AI engines 116 may select the next best action from the development plan based on the particular distribution curve with the intent of moving the particular employee from below average 204 two average 206 or above average 208, thereby improving the employee's scorecard 138 of FIG. 1.

Numerous studies have shown that developing the employees 108 that are in the average portion 206 yields higher performance as compared to developing the employees 108 that are in the below average portion 204. Thus, the employees 108 in the below average portion 204 may be redeployed or let go if they are not able to improve their performance after a predetermined number of next best actions. For example, if a particular employee is in the below average portion 204 and fails to move into the average portion 206 after three next best actions (e.g., nudge 210, training 212, coaching 214), then the particular employee may be let go. In addition, numerous other studies have shown that the higher the performer, the more frequently the high performer benefits from receiving positive reinforcement (e.g., recognition 216). Thus, the employees 108 in the above average portion 208 may frequently receive recognition 216 to keep their performance in the above average portion 208.

Thus, AI engines may analyze each employee's performance based on one or more distribution curves, with each distribution curve corresponding to a particular goal set by the enterprise. Based on each employee's location on the distribution curve, each employee may be classified into multiple categories, such as, for example, below average, average, and above average. The AI engines may identify which particular next best action produces the largest increase in performance for each employee and which particular next best action produces the largest increase in performance for employees in each portion of the distribution curve. The AI engines may predict, based on activity data and metrics, a development plan that includes a next best action. The next best action may be a distribution curve which the AI engines predict to have the maximum "bang for the buck", e.g., that are predicted to result in the largest improvement for each employee.

FIG. 3 is a diagram 300 illustrating metrics used to determine a next best action, according to some embodiments. The AI engines 116 of FIG. 1 may use multiple metrics 302 to determine a next best action. The metrics 302 may include, for example, attendance, ticket creation ratio (e.g., how often the employee creates a ticket), average transfer rate (e.g., how often the employee transfers a call to another employee), average time to resolve an issue, average time on a call with a customer, average number of upsells per call, average dollar amount of upsells per call, and the like. The metrics 302 may be specific to a particular peer group (e.g., sales, helpdesk, marketing, or the like) with which the employee is associated.

Various types of data may be associated with each of the metrics 302. For example, a type 304 may indicate whether a value is a regular value (e.g., higher number is better) or an inverse value (e.g., lower number is better). A coachable 306 may indicate whether or not a particular employee has indicated their willingness to be coached. For example, if a particular employee is coachable, then the particular employee may be provided with on-demand training or a coaching session with a manager or supervisor as part of their development plan. If the particular employees not coachable, then the particular employee be may be provided with on-demand training, a nudge, or recognition as part of their development plan.

The data associated with each metric 302 may include a goal 308 as set by the organization, what the employee actually achieved (actual 310), and what percentage of the goal the employee actually achieved (% to goal 312). For example, an enterprise may set a goal to upsell an average of at least $100 worth of services for customer and a particular employee may reach an actual goal in a particular time period of $80, e.g., a % to goal of 80%.

The metrics 302 may include a scorecard weight 314 and a scaled scorecard 316. The scorecard weight 314 may indicate what weight is placed on the scorecard. The scorecard may be scaled to bring the numerical value of the scorecard within a particular range, such as between 0.0 and 1.0, between 0 and 100, or the like. Scaling of values is typically done to normalize values so that they can be combined in a meaningful manner. For example, a first goal may be to achieve a score of 80 on a first metric, a score of 60 on a second metric, a score of 12 on a third metric, and so on. Before combing the metrics, each score may be scaled. For example, if a particular employee achieves 40 for the first metric, 54 for the second metric, and 3 for the third metric, the results may be scaled by converting each into a percentage, e.g., 50% ($40/80$) for the first metric, 90% ($54/60$) for the second metric, and 25% ($3/12$) for the third metric. In this example, the particular employee may be ranked as average for the first metric, above average for the second metric, and below average for the third metric. A weight may be applied to each scaled metric to create a weighted sum representing a total overall score across all metrics based on the goals and their weighting as set by an organization (e.g., LOB, department, or the like).

The metrics 302 may include a goal weight 318 and a goal scaled 320. For example, some goals may be weighted higher than other goals. To illustrate, the enterprise may weight customer satisfaction higher than up selling services to the customer. Each goal may be scaled to bring the numerical value of the goal within a particular range, such as between 0.0 and 1.0, between 0 and 100, or the like.

The metrics 302 may include information associated with how far a particular employee is from a persona, such as a persona weight 322, a persona target 324, a percent of persona target 326, and a scaled persona 328. The persona target 324 indicates a target that a persona provides to an employee. The percent of persona target 326 indicates how close an employee is to the persona. For example, if the percent of persona target 326 is 50%, then the employee is 50% of the distance (e.g., halfway) to the persona, and if the percent of persona target 326 is 90%, then the employee is 90% of the distance (e.g., very close) to the persona. The persona weight 322 is a weight used to factor in the distance towards the persona when determining the scorecard. The scaled persona 328 is a value determined by scaling the distance between the employee and the persona to bring the numerical value of the distance within a particular range, such as between 0.0 and 1.0, between 0 and 100, or the like.

The metrics 302 may include a previous prediction 330, a current prediction 332, and a next best action value 334. The previous prediction 330 may indicate what was predicted for the employee's scorecard and the previous prediction 330 may be compared with the employee's actual score (e.g., based on the activity data 115). This information may be used by the AI engines 116 to determine how successful the previously recommended next best action and previously determined development plan was in improving the employee's performance. Thus, the AI engines 116 may take into account what worked in the past to improve performance for each particular employee and use the current prediction 332 and the next best action value 334 to determine a next best action.

Figure 4:
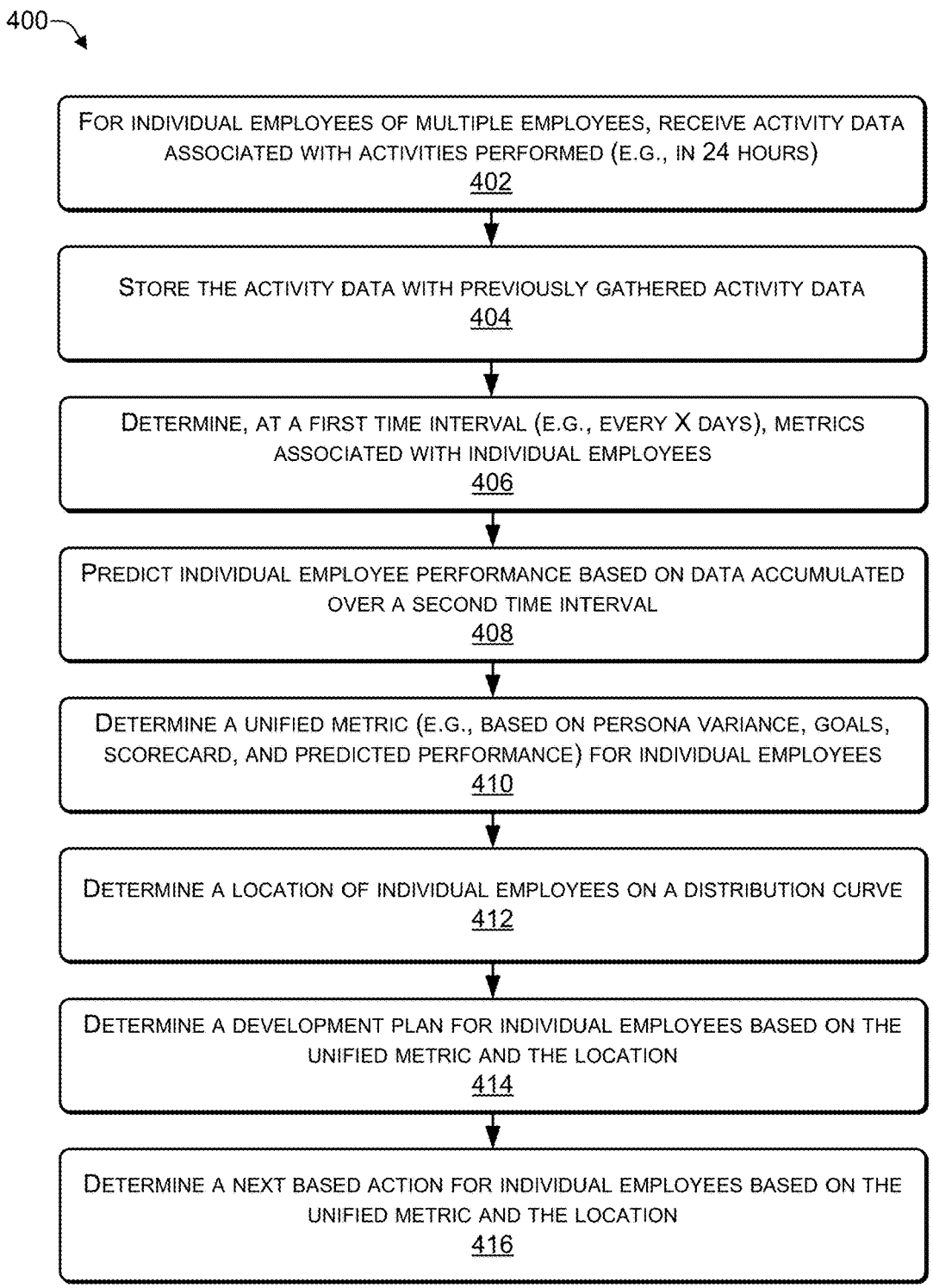
FIG. 4 is a flowchart of a process that includes determining a next best action for individual employees, according to some embodiments.
Figure 5:
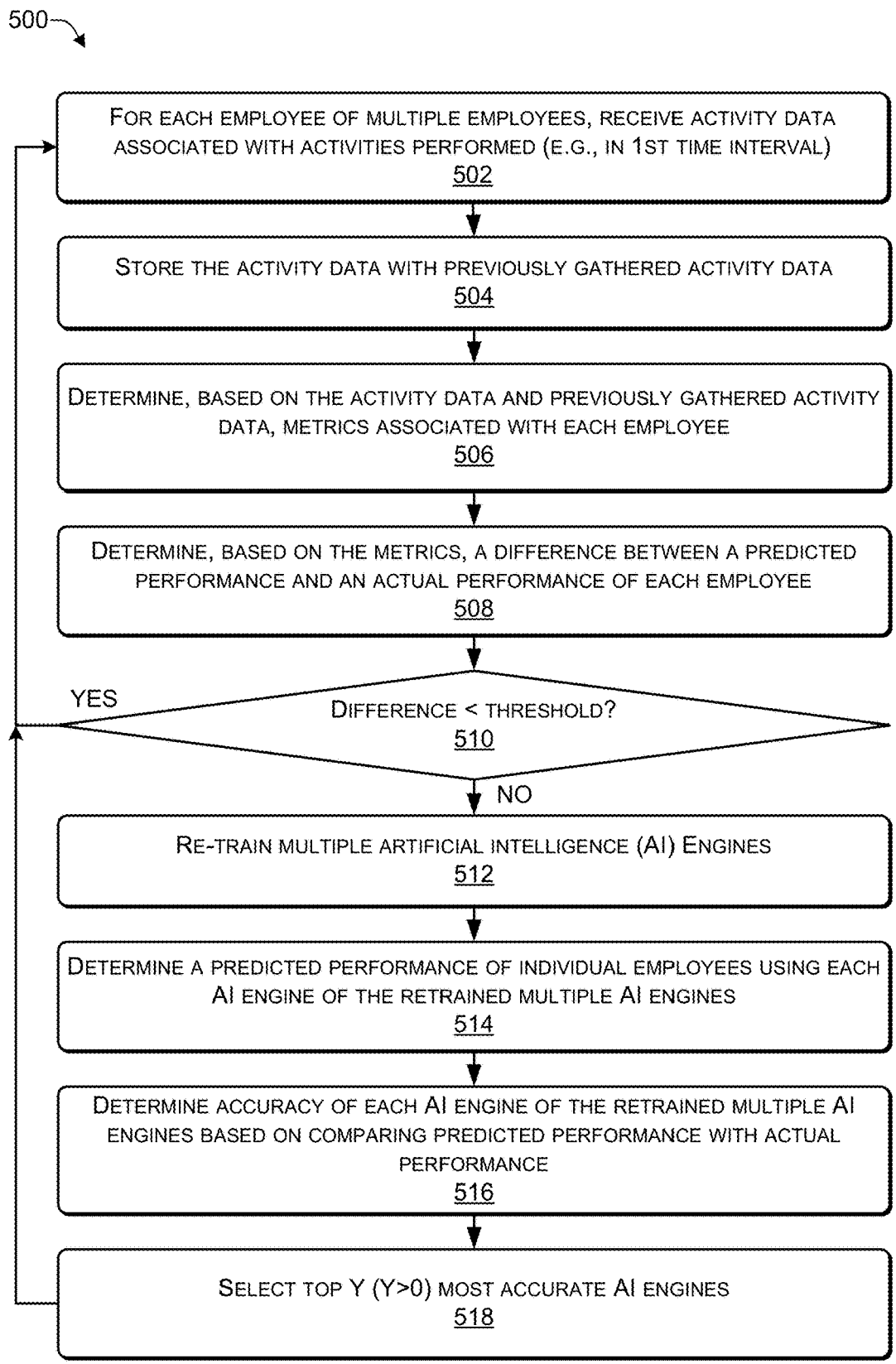
FIG. 5 is a flowchart of a process that includes determining a next best action for individual employees, according to some embodiments.

In the flow diagrams of FIGS. 4 and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400 and 500 are described with reference to FIGS. 1, 2, and 3 as described above, although other models, frameworks, systems and environments may be used to implement this process.

FIG. 4 is a flowchart of a process 400 that includes determining a next best action for individual employees, according to some embodiments. The process 400 may be performed by one or more components (e.g., the AI engines 116) of the server 104 of FIG. 1.

At 402, the server may receive, for individual employees of multiple employees, activity data associated with activities performed (e.g., by the individual employees). At 404, the server may store the activity data with previously gathered activity data. At 406, the server may determine, at a first time interval, metrics associated with individual employees. For example, in FIG. 1, the server 104 may receive the activity data 115 from each of the computing devices 102. The activity data 115 may include actions 110 performed by each of the employees 108 on their corresponding computing device 102. The server 104 may store the activity data 115 in the database 118 and use the AI engines 116 to determine various metrics 122. For example, the server 104 may receive the activity data 115 on the close of business each Friday. The activity data 115 may include one week's worth of activity. The server may determine the metrics 122 to enable the development plan 120 for the next best action 126 to be determined for the following week.

At 408, the server may predict individual employee performance based on data accumulated over a second time interval. For example, in FIG. 1, the server 104 may receive the activity data 115 that was accumulated over a first time interval (e.g., one week). The server 104 may determine a portion of the metrics 122 over a second time interval (e.g., two weeks, one month, or the like) and make the prediction 136 based on the portion of the metrics 122 over the second time interval.

At 410, the server may determine a unified metric (e.g., based on persona variance, goals, scorecard and predicted performance) for individual employees. For example, in FIG. 1, the server 104 may determine the unified metric 128 based on the portion of the metrics 122 associated with the second time interval. In this way, the unified metric 128 may be determined based on activity data in a sliding window with the length equal to the second time interval (e.g., the last 1 month of activity data).

At 412, the server may determine a location of individual employees on a distribution curve (e.g., created based on data associated with the multiple employees). For example, the server 104 of FIG. 1 may plot the unified metric 128 associated with individual ones of the employees 108 to determine the distribution curve 202 and determine a location of individual employees 108 on the distribution curve 202. The distribution curve 202 based on the unified metric 128 may identify how individual employees are performing relative to their peers.

At 414, the server may determine a development plan for individual employees based on the unified metric and the location of individual employees on the distribution curve. For example, in FIG. 2, the development plan 124 associated with an individual employee 108 may be based on a location of the individual employee 108 on the distribution curve 202.

At 416, the server may determine a next best action for individual employees based on the unified metric and the location of individual employees on the distribution curve. For example, in FIG. 2, the unified metric 128 of FIG. 1 and the location of an individual and ploidy 108 on the distribution curve 202 may be used to determine the next best action 126. For example, the AI engines 116 may use the unified metric 128 to identify a subset of employees 108 whose performance can be improved, such as those in the average portion 206. The AI engines 116 may analyze the subset of the employees 108 by determining the persona variance 132 for each of the employees for each of the goals 134. The AI engines 116 may identify the next best action 126 by identifying the largest persona variance 132 for each of the employees for each of the goals 134. For example, a particular employee may be in the average portion 206 for S of T goals (0<S<T) and in the below average portion 204 for the remaining goals (e.g., T-S). In this example, the remaining goals having the largest persona variance 132 may be selected and an appropriate next best action determined.

Thus, a server may receive activity data from computing devices identifying which activities employees have engaged in over a first time interval (e.g., one week). The server may add the activity data to previously received activity data and determine metrics for each employee over a second time interval that is longer than the first time interval (e.g., one month). The server may use one or more AI engines to determine a unified metric, create a distribution curve that includes the unified metric for all employees in a peer group, and determine which group (e.g., below average, average, above average) each employee is located on the distribution curve. Based on the employee's location and unified metric, the AI engines may determine a next best action associated with each employee. For example, below average employees may be provided with the nudge or with training to move them higher on the distribution curve. Average employees may be provided with coaching, training, recognition or any combination thereof to move them higher on the distribution curve. Above average employees may receive recognition (e.g., positive reinforcement), training, or both to keep them above average or move them higher on the above average portion of the distribution curve.

FIG. 5 is a flowchart of a process 500 that includes determining a next best action for individual employees, according to some embodiments. The process 500 may be performed by one or more components (e.g., the AI engines 116) of the server 104 of FIG. 1.

At 502, for each employee of multiple employees the server may receive activity data (e.g., gathered over 1 week) associated with activities performed. At 504, the server may store the activity data with previously gathered activity data. At 506, the server may determine, based on the activity data and previously gathered activity data (e.g., activity data gathered over a month), metrics associated with each employee. For example, in FIG. 1, the server may receive the activity data 115 (e.g., associated with one week of activity) from individual ones of the computing devices 102, store the activity data 115 with previously received activity data, and based on activity data gathered within a particular time period (e.g., one month or the like), determine the metrics 122.

At 508, the server may determine, based on the metrics a difference between a predicted performance and an actual performance of individual employees. The server may determine, at 510, whether the difference is less than a threshold. If the server determines, at 510, that the difference is less than the threshold, then the server may proceed to 502 to receive additional activity data. If the difference, at 510, is greater than or equal to the threshold, the server may retrain the multiple AI engines, at 512. For example, in FIG. 2, at the end of a week, the AI engines 116 (of FIG. 1) may determine a predicted performance of a particular employee based on a next best action. At the end of the following week, the AI engines 116 may compare the predicted performance with the actual performance of the particular employee. If the difference between the predicted performance and the actual performance is less than a threshold indicating that the predicted performance was a relatively accurate prediction, then the AI engines 116 may continue to be used to determine a next best action. If the difference between the predicted performance in the actual performance is greater than or equal to the threshold, indicating that the predicted performance was an in accurate prediction, then the AI engines 116 may be retrained using additional data (e.g., up to and including the recently received activity data).

At 514, the server may determine a predicted performance of individual employees using each AI engine of the retrained multiple AI engines. At 516, the server may determine an accuracy of each AI engine of the retrained multiple AI engines based on comparing a predicted performance with actual performance (e.g., for each AI engine). At 518, the server may select a top of Y (e.g., Y>0) most accurate AI engines 116. For example, in FIG. 1, the server 104 may use each the retrained AI engines 116 to predict, based on previously gathered activity data, a next best action and predict a performance of each employee based on the next best action. The server 104 may compare the predicted performance with the actual performance of each employee to identify the Y (e.g., Y>0, Y=3, 5, 10 or the like) most accurate of the AI engines 116. The server 104 may use the Y most accurate of the AI engines 116 to determine the next best action and then select the next best action based on how many of the AI engines 116 selected a particular next best action. For example, assume the server 104 uses ten of the AI engines 116 to determine the next best action. If a majority (e.g., six or more) of the AI engines 116 select a particular next best action, then the server 104 may select the particular next best action for a particular one of the employees 108. As another example, if four of the AI engines 116 select a particular next best action and the other six AI engines each select a different next best action, then the server 104 may select the particular next best action for a particular one of the employees 108. In this way, the AI engines 116 may be used to "vote" on a next best action. Using multiple AI engines to determine the next best action my reduce bias associated with each AI engine. For example, training data may unintentionally introduce bias. To illustrate, training data that is gathered predominately from a portion of the population may cause an AI engine to exhibit race bias, gender bias, or the like.

Figure 6:
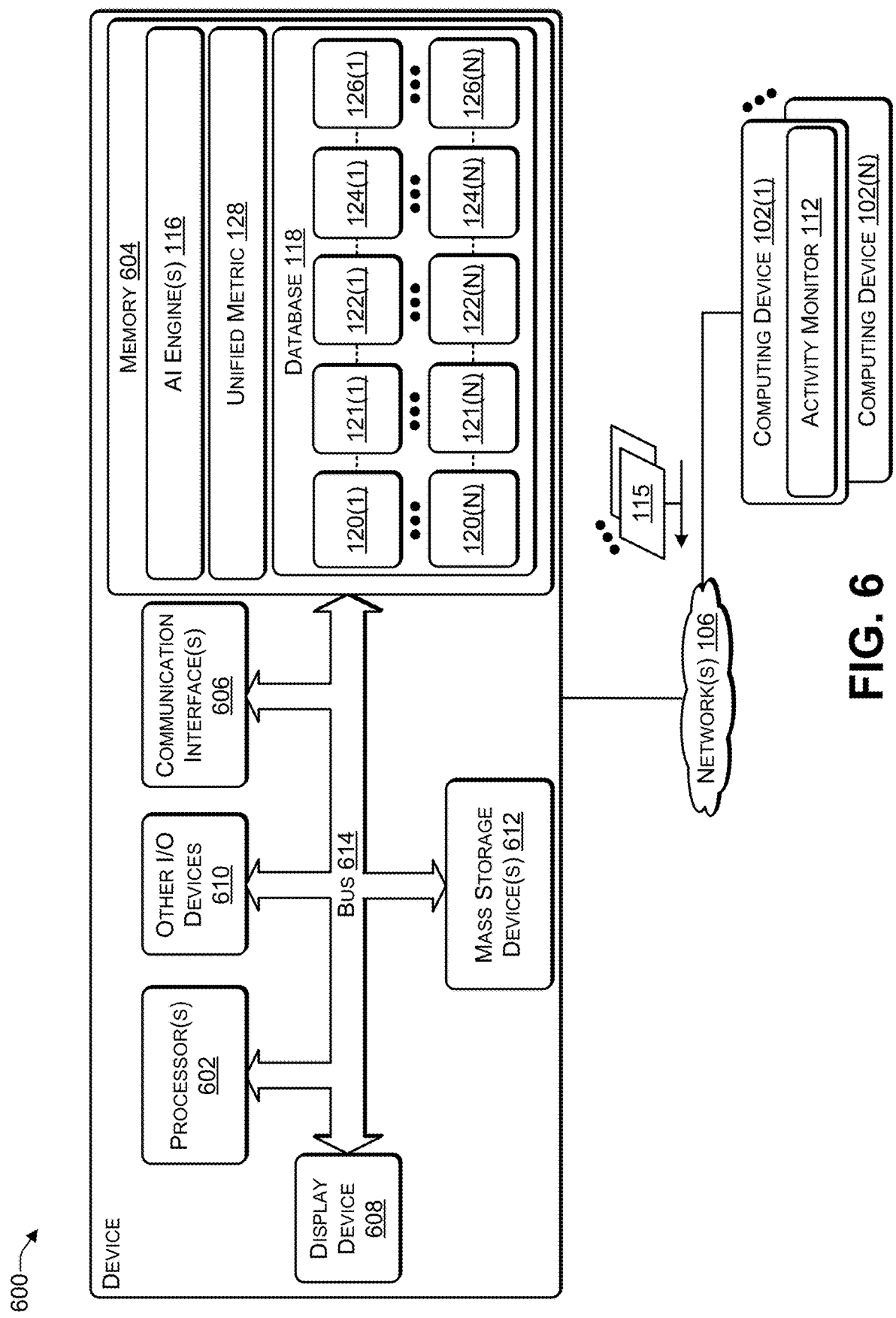
FIG. 6 illustrates an example configuration of a computing device that can be used to implement the systems and techniques described herein.

FIG. 6 illustrates an example configuration of a device 600 that can be used to implement the systems and techniques described herein, such as, for example, the computing devices 102, and/or the server 104 of FIG. 1. For illustration purposes, the device 600 is illustrated in FIG. 6 as implementing the server 104 of FIG. 1.

The device 600 may include one or more processors 602 (e.g., CPU, GPU, or the like), a memory 604, communication interfaces 606, a display device 608, other input/output (I/O) devices 610 (e.g., keyboard, trackball, and the like), and one or more mass storage devices 612 (e.g., disk drive, solid state disk drive, or the like), configured to communicate with each other, such as via one or more system buses 614 or other suitable connections. While a single system bus 614 is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may include a graphics processing unit (GPU) that is integrated into the CPU or the GPU may be a separate processor device from the CPU. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein and may be any type of non-transitory media capable of storing computer-readable, processor-executable program instructions as computer program code that can be executed by the processors 602 as a particular machine configured for carrying out the operations and functions described in the implementations herein.

The device 600 may include one or more communication interfaces 606 for exchanging data via the network 108. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The display device 608 may be used for displaying content (e.g., information and images) to users. Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data, including, for example, the AI engines 116, the unified metric 128, the database 118, and the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising: determining, by one or more processors and based on a portion of aggregated data, a plurality of metrics associated with an employee, the aggregated data including activities performed by the employee using a computing device; training individual artificial intelligence engines of a plurality of artificial intelligence engines using at least the portion of the aggregated data to create a plurality of trained artificial intelligence engines; determining, by the one or more processors and based on the plurality of metrics, a unified metric associated with the employee, wherein determining the unified metric comprises: determining a persona variance comprising a difference between a location of the employee on a distribution curve and a persona on the distribution curve, the persona determined based on a set of above average performing employees, the persona having a greater score on the distribution curve than the employee; determining a goal difference between a target goal set for the employee and an actual goal achieved by the employee, the actual goal determined based on the plurality of metrics; determining a scorecard associated with the employee that is determined based on the plurality of metrics; determining a predicted performance associated with the employee for a subsequent time period, the predicted performance predicted by the plurality of trained artificial intelligence engines; and determining the unified metric based at least in part on the persona variance, the goal difference, the scorecard, and the predicted performance; creating, by the one or more processors, a distribution curve based on the unified metric associated with the employee and based on additional unified metrics associated with additional employees; determining, by the one or more processors, the location of the employee on the distribution curve; predicting, by the plurality of trained artificial intelligence engines and based on the location of the employee on the distribution curve, a next best action for the employee; and sending, by the one or more processors, information associated with the next best action to the employee and to a supervisor of the employee to improve a future performance of the employee.

2. The method of claim 1, further comprising:
receiving, from the computing device, activity data associated with activities performed by the employee in a first time interval;
storing the activity data with previously gathered data to created aggregated data; and
selecting a portion of the aggregated data associated with a second time interval, the second time interval greater than the first time interval.

3. The method of claim 1, further comprising:
determining an accuracy of individual artificial intelligence engines of the plurality of trained artificial intelligence engines; and
selecting, based at least in part of the accuracy, at least a portion of the plurality of trained artificial intelligence engines to determine the unified metric.

4. The method of claim 1, wherein determining the unified metric further comprises:
performing a personal scaling of the persona variance to create a scaled persona variance;
performing a goal scaling of the goal difference to create a scaled goal difference;
performing a scorecard scaling of the scorecard to create a scaled scorecard;
performing a prediction scaling of the predicted performance to create a scaled predicted performance; and
determining the unified metric based on a weighted sum of the scaled persona variance, the scaled goal difference, the scaled scorecard, and the scaled predicted performance.

5. The method of claim 1, wherein the next best action comprises:
scheduling a nudge;
scheduling a training class;
scheduling a coaching session with a supervisor;
scheduling the employee to receive a type of positive reinforcement; or
any combination thereof.

6. The method of claim 1, further comprising:
for a particular metric of the plurality of metrics, dividing the distribution curve into:
a below average portion;
an average portion; and
an above average portion; and
determining the next best action based at least in part on which portion of the distribution curve the employee is located.

7. The method of claim 1, further comprising:
determining a development plan for the employee based at least in part on the location of the employee on the distribution curve.

8. A server comprising:
one or more processors; and
one or more non-transitory computer readable media storing instructions executable by the one or more processors to perform operations comprising:

determining, based on a portion of aggregated data, a plurality of metrics associated with an employee, the aggregated data including activities performed by the employee using a computing device;

training individual artificial intelligence engines of a plurality of artificial intelligence engines using at least a portion of the aggregated data to create a plurality of trained artificial intelligence engines;

determining, based on the plurality of metrics, a unified metric associated with the employee, wherein determining the unified metric comprises:

determining a persona variance comprising a difference between a location of the employee on a distribution curve and a persona on the distribution curve, the persona determined based on a set of above average performing employees, the persona having a greater score on the distribution curve than the employee;

determining a goal difference between a target goal set for the employee and an actual goal achieved by the employee, the actual goal determined based on the plurality of metrics;

determining a scorecard associated with the employee that is determined based on the plurality of metrics;

determining a predicted performance associated with the employee for a subsequent time period, the predicted performance predicted by the plurality of trained artificial intelligence engines; and determining the unified metric based at least in part on the persona variance, the goal difference, the scorecard, and the predicted performance;

determining a distribution curve based on the unified metric associated with the employee and based on additional unified metrics associated with additional employees;

determining a location of the employee on the distribution curve;

predicting, by the plurality of trained artificial intelligence engines and based on the location of the employee on the distribution curve, a next best action for the employee; and sending information associated with the next best action to the employee and to a supervisor of the employee to improve a future performance of the employee.

9. The server of claim 8, further comprising:
receiving, from the computing device, activity data associated with activities performed by the employee in a first time interval;
storing the activity data with previously gathered data to created aggregated data; and
selecting a portion of the aggregated data associated with a second time interval, the second time interval greater than the first time interval.

10. The server of claim 8, wherein:
a first artificial intelligence engine of the plurality of trained artificial intelligence engines uses a first type of artificial intelligence algorithm; and
a second artificial intelligence engine of the plurality of trained artificial intelligence engines uses a second type of artificial intelligence algorithm that is different from the first type of artificial intelligence algorithm.

11. The server of claim 8, wherein determining the unified metric further comprises:
performing a personal scaling of the persona variance to create a scaled persona variance;
performing a goal scaling of the goal difference to create a scaled goal difference;

performing a scorecard scaling of the scorecard to create a scaled scorecard;
performing a prediction scaling of the predicted performance to create a scaled predicted performance; and
determining the unified metric based on a weighted sum of the scaled persona variance, the scaled goal difference, the scaled scorecard, and the scaled predicted performance.

12. The server of claim 8, wherein the next best action comprises:
scheduling a nudge;
scheduling a training class;
scheduling a coaching session with a supervisor;
scheduling the employee to receive a type of positive reinforcement; or
any combination thereof.

13. The server of claim 8, the operations further comprising:
determining an accuracy of individual artificial intelligence engines of the plurality of trained artificial intelligence engines; and
selecting, based at least in part of the accuracy, at least a portion of the plurality of trained artificial intelligence engines to determine the unified metric.

14. The server of claim 8, wherein:
a first artificial intelligence engine of the plurality of trained artificial intelligence engines uses a first type of artificial intelligence algorithm; and
a second artificial intelligence engine of the plurality of trained artificial intelligence engines uses a second type of artificial intelligence algorithm that is different from the first type of artificial intelligence algorithm.

15. A memory device to store instructions executable by one or more processors to perform operations comprising: determining, based on a portion of aggregated data, a plurality of metrics associated with an employee, the aggregated data including activities performed by the employee using a computing device; training individual artificial intelligence engines of a plurality of artificial intelligence engines using training data that includes at least a portion of the aggregated data to create a plurality of trained artificial intelligence engines; determining, based on the plurality of metrics, a unified metric associated with the employee; determining a distribution curve based on the unified metric associated with the employee and based on additional unified metrics associated with additional employees, wherein determining the unified metric comprises: determining a persona variance comprising a difference between a location of the employee on a distribution curve and a persona on the distribution curve, the persona determined based on a set of above average performing employees, the persona having a greater score on the distribution curve than the employee; determining a goal difference between a target goal set for the employee and an actual goal achieved by the employee, the actual goal determined based on the plurality of metrics; determining a scorecard associated with the employee that is determined based on the plurality of metrics; determining a predicted performance associated with the employee for a subsequent time period, the predicted performance predicted by the plurality of trained artificial intelligence engines; and determining the unified metric based at least in part on the persona variance, the goal difference, the scorecard, and the predicted performance; determining a location of the employee on the distribution curve; predicting, by the plurality of trained artificial intelligence engines and based on the location of the employee on the distribution curve, a next best action for the employee; and sending information associated with the next best action to the employee and to a supervisor of the employee to improve a future performance of the employee.

16. The memory device of claim 15, further comprising:
receiving, from the computing device, activity data associated with activities performed by the employee in a first time interval;
storing the activity data with previously gathered data to created aggregated data; and
selecting a portion of the aggregated data associated with a second time interval, the second time interval greater than the first time interval.

17. The memory device of claim 15, further comprising:
determining an accuracy of individual artificial intelligence engines of the plurality of trained artificial intelligence engines; and
selecting, based at least in part of the accuracy, at least a portion of the plurality of trained artificial intelligence engines to determine the unified metric.

18. The memory device of claim 15, wherein the next best action comprises:
scheduling a nudge;
scheduling a training class;
scheduling a coaching session with a supervisor;
scheduling the employee to receive a type of positive reinforcement; or
any combination thereof.

19. The memory device of claim 15 further comprising:
dividing the distribution curve into:
a below average portion;
an average portion; and
an above average portion; and
determining the next best action based at least in part on which portion of the distribution curve the employee is located.

20. The memory device of claim 15, further comprising:
determining a development plan for the employee based at least in part on the location of the employee on the distribution curve.

* * * * *